(12) United States Patent
Freeman

(10) Patent No.: US 10,563,528 B2
(45) Date of Patent: Feb. 18, 2020

(54) TURBINE VANE WITH CERAMIC MATRIX COMPOSITE AIRFOIL

(71) Applicant: Rolls-Royce North American Technologies, Inc., Indianapolis, IN (US)

(72) Inventor: Ted J. Freeman, Danville, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 277 days.

(21) Appl. No.: 15/602,873

(22) Filed: May 23, 2017

(65) Prior Publication Data

US 2018/0340430 A1  Nov. 29, 2018

(51) Int. Cl.
*F01D 9/04* (2006.01)
*F01D 25/24* (2006.01)

(52) U.S. Cl.
CPC ........... *F01D 9/041* (2013.01); *F01D 9/042* (2013.01); *F01D 25/246* (2013.01); *F05D 2230/236* (2013.01); *F05D 2230/237* (2013.01); *F05D 2260/30* (2013.01); *F05D 2260/36* (2013.01); *F05D 2300/6033* (2013.01)

(58) Field of Classification Search
CPC ........ F02D 9/041; F02D 25/246; F01D 9/041; F01D 25/246; F01D 9/042
See application file for complete search history.

(56) References Cited

U.S. PATENT DOCUMENTS

| | | | |
|---|---|---|---|
| 2,771,622 A | 11/1956 | Thorp, II | |
| 3,112,916 A * | 12/1963 | Miller, Jr. | F01D 9/042 416/220 R |
| 3,909,157 A | 9/1975 | Wachtell et al. | |
| 4,245,954 A * | 1/1981 | Glenn | F01D 5/284 415/200 |
| 4,907,946 A * | 3/1990 | Ciokajlo | F01D 9/042 415/135 |
| 5,332,360 A | 7/1994 | Correia et al. | |
| 5,474,419 A | 12/1995 | Reluzco et al. | |
| 5,797,725 A | 8/1998 | Rhodes | |
| 6,682,299 B2 * | 1/2004 | Bowen | F01D 9/02 384/273 |
| 7,713,022 B2 * | 5/2010 | Major | F01D 17/162 29/889.22 |
| 8,231,354 B2 * | 7/2012 | Campbell | B23P 15/04 416/193 A |
| 8,727,730 B2 * | 5/2014 | Liotta | F01D 5/282 416/193 A |
| 10,215,040 B2 * | 2/2019 | Yagi | F04D 29/542 |
| 2011/0142639 A1 * | 6/2011 | Campbell | F01D 5/081 416/95 |
| 2011/0171018 A1 * | 7/2011 | Garcia-Crespo | F01D 9/041 415/208.2 |
| 2011/0243746 A1 * | 10/2011 | Liotta | F01D 5/282 416/214 R |
| 2012/0163979 A1 * | 6/2012 | Darkins, Jr. | B22D 19/0054 416/223 R |

(Continued)

*Primary Examiner* — Erick R Solis
*Assistant Examiner* — Anthony L Bacon
(74) *Attorney, Agent, or Firm* — Barnes & Thornburg LLP

(57) ABSTRACT

A turbine vane adapted for use in a gas turbine engine is described in this application. The turbine vane illustratively includes ceramic matrix composite components adapted to be coupled to metallic components.

19 Claims, 3 Drawing Sheets

(56) References Cited

U.S. PATENT DOCUMENTS

| | | | |
|---|---|---|---|
| 2015/0003978 A1* | 1/2015 | Watanabe | F01D 5/282 |
| | | | 415/208.1 |
| 2016/0017731 A1 | 1/2016 | Becker et al. | |
| 2016/0201483 A1* | 7/2016 | Engel | F01D 5/282 |
| | | | 416/220 R |
| 2017/0335699 A1* | 11/2017 | Kington | F01D 9/041 |
| 2018/0149026 A1* | 5/2018 | Vetters | F01D 5/282 |

\* cited by examiner

TURBINE VANE WITH CERAMIC MATRIX COMPOSITE AIRFOIL

FIELD OF THE DISCLOSURE

The present disclosure relates generally to gas turbine engines, and more specifically to vanes used in gas turbine engines that include ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The integration of ceramic matrix composite materials into static vane assemblies is of interest because of the high-temperature capability of these materials. However, coupling ceramic matrix composite materials to other components included in gas turbine engines presents challenges based the mechanical characteristics of the various materials used (strength, coefficients of thermal expansion, etc.).

SUMMARY

The present disclosure may comprise one or more of the following features and combinations thereof.

According to the present disclosure, a turbine vane adapted for use in a gas turbine engine includes a ceramic matrix composite component and a metallic end wall coupled to the ceramic matrix composite component. The ceramic matrix composite component is formed to include an airfoil shaped to interact with hot gasses moving along a primary gas path defined by the gas turbine and an attachment feature that extends from a radial end of the airfoil. The metallic end wall is shaped to define a boundary of the primary gas path near a radial end of the airfoil.

In illustrative embodiments, the metallic end wall may include a first part and a second part coupled to the first part. The first part and the second part may each be shaped to include a gas path panel that defines part of the boundary of the primary gas path and an attachment receiver that forms a pocket into which a portion of the attachment feature included in the ceramic matrix composite component extends. The pockets formed by the attachment receivers of the first and the second part of the metallic end wall may cooperate to define an attachment-feature receiving space shaped to block removal of the attachment feature from the pockets while the first part and the second part of the metallic end wall are coupled to one another so that the ceramic matrix composite component is mounted to the metallic end wall.

In illustrative embodiments, the attachment feature may have a dovetail shape and the attachment feature receiving space forms a corresponding dovetail-shaped void. The first part of the metallic end wall may be coupled to the second part of the metallic end wall by a diffusion weld. The first part of the metallic end wall may be coupled to the second part of the metallic end wall by a braze layer. The first part of the metallic end wall may be coupled to the second part of the metallic end wall by mechanical fasteners.

In illustrative embodiments, the attachment receivers included in the metallic end wall may extend in a radial direction from the gas path panel away from the primary gas path and are located outside the primary gas path. The pocket of each of the attachment receivers may receive about half of the attachment feature included in the ceramic matrix composite component.

In illustrative embodiments, the ceramic matrix composite component may be a substantially solid component without cooling air passages formed therein. The attachment-feature receiving space may be sized so that the metallic end wall is interference fit with the attachment feature of the ceramic matrix composite component.

The gas path panels of the metallic end wall may be formed to include attachment apertures shaped to allow the attachment feature of the ceramic matrix composite component to extend into the attachment-feature receiving space. The first part and the second part of the metallic end wall each may include at least one case hanger that extends in a radial direction from the gas path panel away from the primary gas path and that is configured to be coupled to a turbine case.

In illustrative embodiments, metallic end wall may be formed to include an airfoil receiving space into which the radial end of the airfoil extends. The airfoil receiving space may have a shape complementary to that of the radial end of the airfoil. The gas path panels of the metallic end wall may each be formed to include a cutout that forms part of the airfoil receiving space.

According to the present disclosure, a static vane adapted for use in a turbine may include a ceramic matrix composite component and an end wall. The ceramic matrix composite component may be formed to include an airfoil shaped to interact with gasses moving along a primary gas path and an attachment feature that extends from a radial end of the airfoil.

In illustrative embodiments, the end wall may include a first part and a second part. The first part and the second part may each be shaped to include a gas path panel and an attachment receiver that forms a pocket into which a portion of the attachment feature included in the ceramic matrix composite component extends. The pockets formed by the attachment receivers of the first and the second part of the end wall may cooperate to define an attachment-feature receiving space shaped to block removal of the attachment feature from the pockets while the first part and the second part of the end wall are coupled to one another.

In illustrative embodiments, the first part of the end wall may be coupled to the second part of the end wall by a braze layer. The first part of the metallic end wall may be coupled to the second part of the metallic end wall by diffusion bonding. The attachment feature may have a dovetail shape and the attachment feature receiving space forms a corresponding dovetail-shaped void. The attachment-feature receiving space may be sized so that the metallic end wall is interference fit with the attachment feature of the ceramic matrix composite component.

According to the present disclosure, a method of assembling a turbine vane for a gas turbine engine is taught. The method may include fabricating a ceramic matrix composite component shaped to include an airfoil and an attachment feature that extends from a radial end of the airfoil by infiltrating ceramic-containing fiber reinforcements with ceramic-containing matrix material. The method may further include manufacturing first and second parts of a metallic end wall by casting first and second near-net-shape parts and machining the first and second near net shape parts so that the first and second parts each include a gas path panel and an attachment receiver that forms a pocket.

In illustrative embodiments, the method may include assembling the first and the second parts of the metallic end wall with the ceramic matrix composite component by inserting a portion of the attachment feature into each of the pockets formed in the first and second parts and coupling the first part of the metallic end wall to the second part of the metallic end wall in such a way that the attachment feature of the ceramic matrix composite component is trapped in an attachment-feature receiving space formed by the pockets blocking removal of the attachment feature from the attachment-receiving space while the first and the second parts are coupled to one another so that the ceramic matrix composite component is mounted to the metallic end wall.

In illustrative embodiments, coupling the first part of the metallic end wall to the second part of the metallic end wall may include diffusion welding of the first part of the metallic end wall to the second part of the metallic end wall.

These and other features of the present disclosure will become more apparent from the following description of the illustrative embodiments.

DETAILED DESCRIPTION OF THE DRAWINGS

Figure 1:
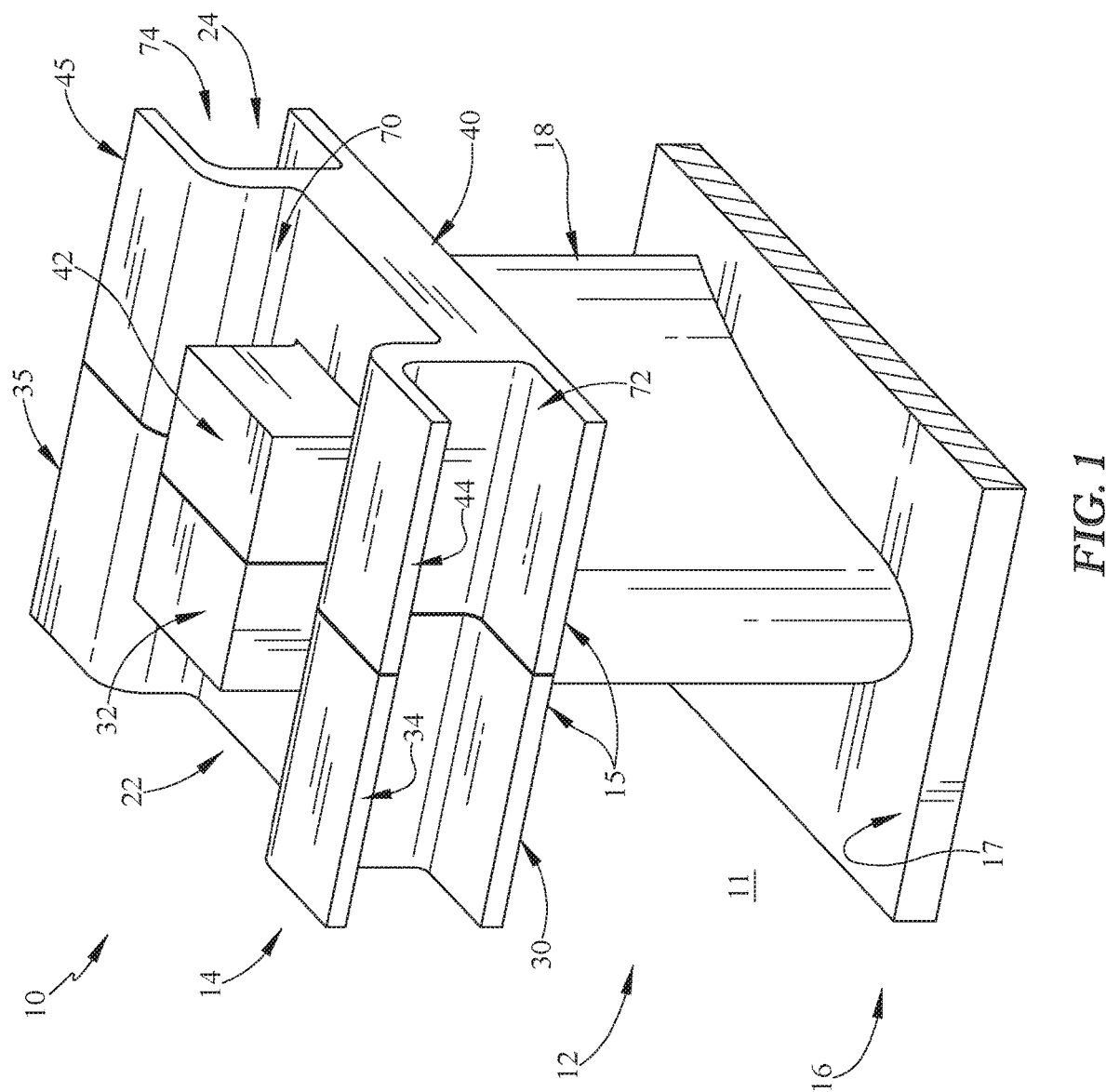
FIG. 1 is a perspective view of a turbine vane adapted for use in a gas turbine engines showing that the turbine vane includes a ceramic matrix composite airfoil and metallic end walls.

For the purposes of promoting an understanding of the principles of the disclosure, reference will now be made to a number of illustrative embodiments illustrated in the drawings and specific language will be used to describe the same.

An illustrative turbine vane 10 adapted for use in a gas turbine engine in shown in FIG. 1. Turbine vane 10 is a static component that redirects gas moving through the gas turbine engine so that flow of the gas is smooth and properly oriented for interaction with turbine blades aft of the turbine vane 10. Turbine vane 10 is illustratively shown as a singlet, having only a single airfoil 18; however, it is within the scope of this disclosure for the present teachings to apply to doublets, triplets, etc. having multiple airfoils in a single assembly.

Figure 2:
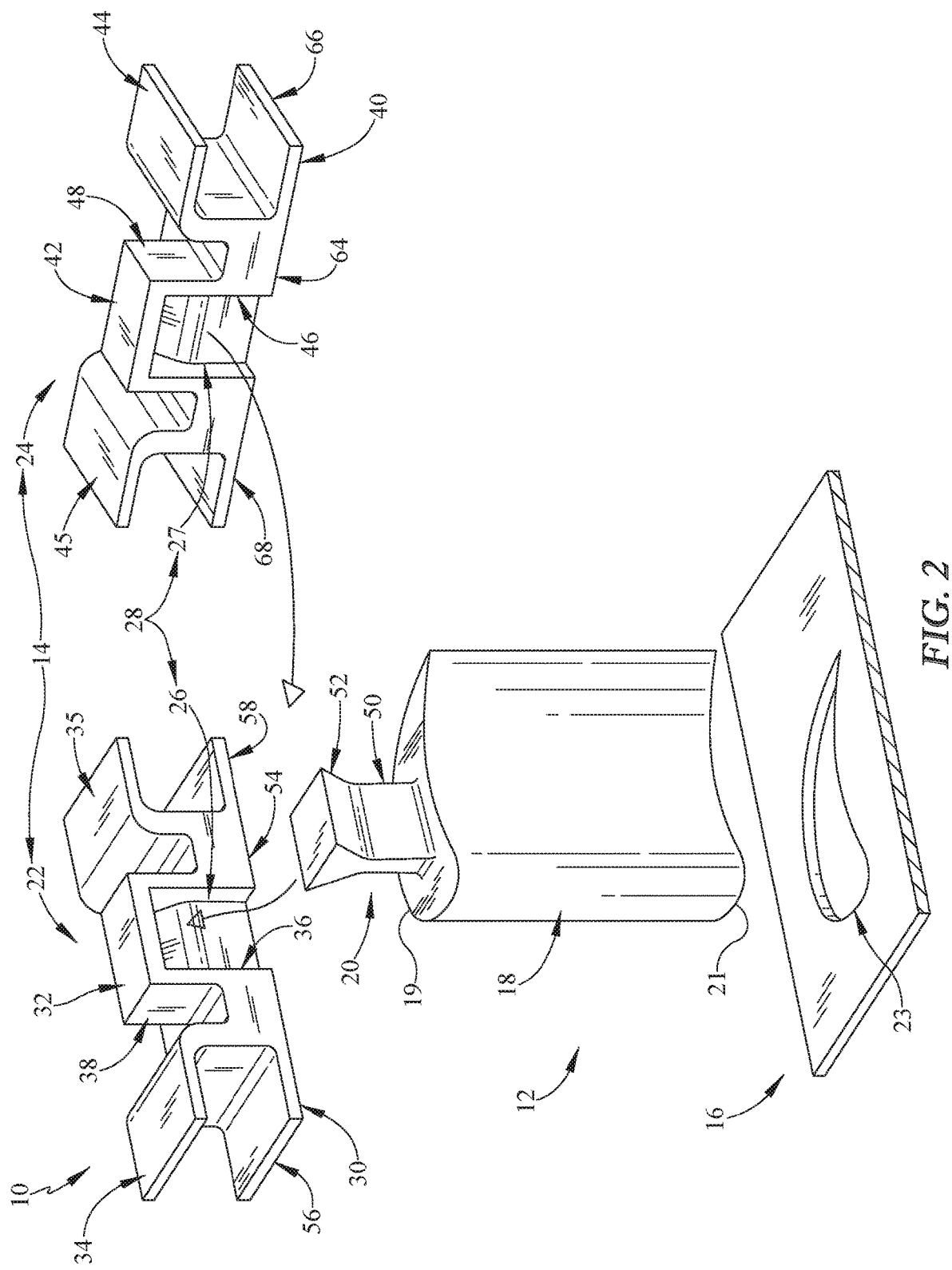
FIG. 2 is an exploded perspective assembly view of the turbine vane of FIG. 1 showing that the outer end wall is made up of first and second end wall components, and further showing that an attachment feature (illustratively a dovetail) extending from the airfoil is received in an attachment retainer integrated with the components of the outer end wall to create an attachment mechanism for holding the airfoil in place relative to the outer end wall.

Turbine vane 10 includes an airfoil component 12, an outer end wall 14, and an inner end wall 16 as shown in FIGS. 1 and 2. Illustratively, airfoil component 12 is made of ceramic matrix composite materials and is positioned across a primary gas path 11 of the gas turbine engine to interact with hot gasses moving along primary gas path 11. Outer end wall 14 and inner end wall 16 are coupled to airfoil component 12 to provide boundaries for primary gas path 11. Outer end wall 14 is made of metallic materials suitable for use along gas path 11 and provides means for mounting the ceramic matrix composite airfoil component 12 to other metallic components of the gas turbine engine.

Airfoil component 12 is made from ceramic matrix composite materials designed to withstand high temperatures as suggested in FIGS. 1 and 2. Airfoil component 12 includes an airfoil 18 and an attachment feature 20. Airfoil 18 is aerodynamically shaped to interact with hot gasses moving along primary gas path 11. Airfoil 18 has a radially outer end 19 and a radially inner end 21. Attachment feature 20 extends radially outward from radially outer end 19 of airfoil 18 and is configured to engage outer end wall 14 as shown in FIG. 1 and suggested in FIG. 2.

Outer end wall 14 is coupled to airfoil component 12 and provides an outer boundary 15 for primary gas path 11 as shown in FIG. 1. Outer end wall 14 illustratively includes a first metallic part 22 and a second metallic part 24. First part 22 and second part 24 are coupled to one another so that ceramic matrix composite airfoil component 12 is mounted to outer end wall 14. First part 22 and second part 24 are each formed to include a corresponding pocket 26, 27; pockets 26, 27 together form an attachment-receiving space 28 when first part 22 engages second part 24 as shown in FIG. 1 and suggested in FIG. 2.

First part 22 and second part 24 are illustratively fabricated by casting near-net-shaped parts and machining pockets 26, 27 into each part 22, 24. First part 22 and second part 24 are illustratively joined or bonded to one another by brazing, diffusion welding, mechanical fasteners, or any other suitable method.

Attachment feature 20 is configured to be received by attachment-receiving space 28 when first part 22 engages second part 24 as show in FIG. 1 and suggested in FIG. 2. Attachment feature 20 has a dove tail cross-sectional shape to block the removal of attachment feature 20 from attachment receiving space 28 when first part 22 and second part 24 are assembled. However, a fir tree shape or any other suitable shape may be used to block the removal of attachment feature 20 from attachment-receiving space 28 when first piece 22 and second piece 24 are assembled. Attachment-receiving space 28 is shaped to complement/correspond with the shape of attachment feature 20.

In the illustrative embodiment, attachment-receiving space 28 is sized to cause interference fit or press fit of the attachment feature 20 with the outer end wall 14 at room temperatures. The fit may be loosened upon heating of the outer end wall 14 such as during assembly to allow for coupling of first and second parts 22, 24 of the outer end wall 14. During operation, cooling air may be supplied to the outer end wall 14 and/or the airfoil component 12 to maintain interference/press fit with the attachment feature 20 of the airfoil component 12.

Inner end wall 16 is coupled to airfoil component 12 and provides an inner boundary 17 for primary gas path 11 opposite outer end wall 14 as shown in FIG. 1. Inner end wall 16 may be made from ceramic matrix composite materials, metallic materials, or other suitable constituent materials.

Inner end wall 16 is illustratively formed to include an airfoil receiving space 23 as shown in FIG. 2. Radially inner end 21 of airfoil 18 is configured to be received within airfoil receiving space 23 to support ceramic matrix composite airfoil component 12 within the gas turbine engine. Inner end wall 16 is coupled to radially inner end 21 of airfoil 18, illustratively, by brazing but other suitable couplings are contemplated.

Illustratively, inner end wall 16 is an arcuate panel coupled to the radially inner end 21 of a single ceramic matrix composite airfoil component 12. However, in other embodiments, inner end wall 16 may be used with multiple ceramic matrix composite airfoil components in series or in parallel when turbine vane 10 is designed as a doublet assembly, a triplet assembly or another suitable assembly. As such, inner end wall 16 may be formed to include multiple airfoil cutouts configured to receive any number of ceramic matrix composite components.

Turning again to outer end wall 14, first and second part 22, 24 cooperate to define primary flow path 11 and to couple airfoil component 12 to other parts of the gas turbine engine as suggested in FIG. 1. As noted above, first and second parts 22, 24 of outer end wall 14 trap attachment feature 20 of ceramic matrix composite airfoil component 12. By trapping attachment feature 20, first and second parts 22, 24 couple outer end wall 14 to ceramic matrix composite airfoil component 12 when first and second parts 22, 24 are mounted to one another.

First part 22 of outer end wall 14 includes a gas path panel 30, an attachment receiver 32, and forward and aft case hangers 34, 35. Gas path panel 30 defines at least a part of the radially outer boundary 15 of primary gas path 11. Attachment receiver 32 extends radially outward from gas path panel 30 and is formed to include pocket 26. Forward and aft case hangers 34, 35 also extend radially outward from gas path panel 30 and are spaced apart from one another to locate attachment receiver 32 therebetween.

Second part 24 of outer end wall 14 includes a gas path panel 40, an attachment receiver 42, and forward and aft case hangers 44, 45. Gas path panel 40 defines at least a part of the radially outer boundary 15 of primary gas path 11. Attachment receiver 42 extends radially outward from gas path panel 40 and is formed to include pocket 27. Forward and aft case hangers 44, 45 also extend radially outward from gas path panel 40 and are spaced apart from one another to locate attachment receiver 42 therebetween.

In another embodiment, outer end wall 14 of turbine vane 10 may include a third metallic part (not shown) used in conjunction with another airfoil component 12 to produce a doublet vane assembly. The third metallic part is structured substantially similar to first part 22 and second part 24 except that the third part includes two attachment receivers on each circumferential side of the third part. The third part cooperates with first and second parts 22, 24 to couple the two ceramic matrix composite airfoil components 12 to outer end wall 14. As such, each attachment receiver of the third part includes a pocket that receives corresponding attachment features of one of the ceramic matrix composite airfoil components.

The third part is arranged between the ceramic matrix composite airfoil components and first and second parts 22, 24. First part 22 is configured to be coupled to one circumferential side of the third part and second part is configured to be coupled to the other circumferential side of the third part as has been described with regards to the assembly of parts 22 and 24.

In another embodiment, such as in a triplet assembly, outer end wall 14 of turbine vane 10 includes a fourth metallic part that is identical to the third part described above. The fourth part is arranged between either first part 22 and the third part, or second part 24 and the third part.

The fourth part cooperates with the first, second, and third parts to couple three ceramic matrix composite airfoil components 12 to outer end wall 14. In other embodiments, any number of parts similar to the third and fourth parts may be used to couple any number of ceramic matrix composite airfoil components 12 to outer end wall 14.

Figure 3:
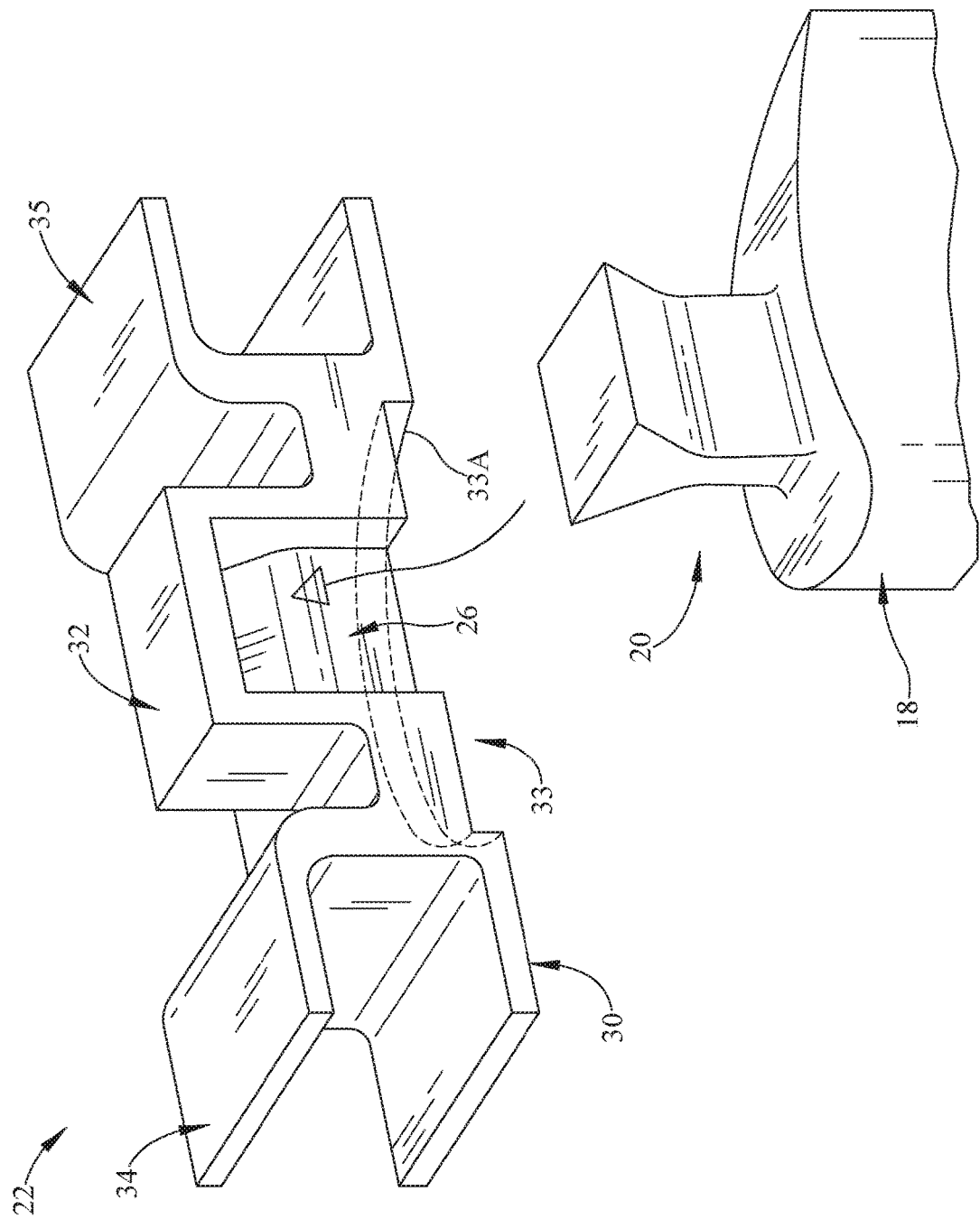
FIG. 3 is a detail view of a portion of FIG. 2 showing that the components of the outer end wall can include an optional cutout shaped to receive a portion of the airfoil so as to seal around the interface between the airfoil and the outer end wall.

Turning again to the present embodiment shown in FIGS. 1-3, gas path panels 30, 40 cooperate to form radially outer boundary 15 of primary gas path 11 when first part 22 and second part 24 are coupled to one another. Attachment receivers 32, 42 of first part 22 and second part 24 open and face one another so that pockets 26 and 27 cooperate to form attachment-feature receiving space 28 when first part 22 engages second part 24. Forward and aft case hangers 34, 35 of first part 22 cooperate with forward and aft case hangers 44, 45 of second part 24 to support outer end wall 14 and ceramic matrix composite airfoil component 12 within the gas turbine engine.

Attachment receivers 32, 42 include body portions 36, 46 and housing portions 38, 48 as shown in FIG. 2. Body portions 36, 46 extend radially outward from gas path panels 30, 40 to form a portion of pockets 26, 27. Housing portions 38, 48 extend radially outward from body portions 36, 46 to form a portion of pockets 26, 27. Together, body portions 36, 46 and housing portions 38, 48 form pockets 26, 27.

Illustratively, body portions 36, 46 and housing portions 38, 48 extend circumferentially across only a portion of first part 22 and second part 24, respectively. However, body portions 36, 46 and housing portions 38, 48 may extend circumferentially across the entire first part 22 and the entire second part 24, respectively.

Attachment feature 20 includes a stem 50 and a head 52 as shown in FIG. 2. Stem 50 extends radially outward from radially outer end 19 of airfoil 18. Head 52 extends radially outward and circumferentially from stem 50. Stem 50 corresponds to body portions 36, 46 of attachment receivers 32, 42 while head 52 corresponds housing portions 38, 48 of attachment receivers 32, 42. Illustratively, stem 50 and head 52 form a dovetail shape, however other suitable shapes may be used, such as, fir-tree shapes and t-shapes. Accordingly, body portions 36, 46, and housing portions 38, 48 may provide any suitable shape to correspond to the shape of attachment feature 20.

Gas path panels 30, 40 include body panels 54, 64, forward panels 56, 66, and aft panels 58, 68 as shown in FIG. 2. Body panels 54, 64 are arranged axially between hangers 34, 35 and hangers 44, 45, respectively. Forward panels 56, 66 extend axially forward and away from body panels 54, 64 and ceramic matrix composite airfoil component 12. Aft panels 58, 68 extend axially aft and away from body panels 54, 64 and ceramic matrix composite airfoil component 12.

Forward hangers 34, 44 and aft hangers 35, 45 extend axially forward and aft from attachment receivers 32, 42, respectively. As such, forward hangers 34, 44 and aft hangers 35, 45 are arranged to, illustratively, provide an attachment cavity 70 when first part 22 and second part 24 are assembled and coupled to the gas turbine engine. Housing portions 38, 48 of attachment receivers 32, 42 extend radially outward into attachment cavity 70.

Forward hangers 34, 44 and aft hangers 35, 45 are spaced radially outward from forward panels 56, 66 and aft panels 58, 68. As such, forward hangers 34, 44 and forward panels 56, 66 are arranged to, illustratively, define a forward hanger cavity 72 when first part 22 and second part 24 are assembled and coupled to the gas turbine engine. Aft hangers 35, 45 and aft panels 58, 68 are arranged to, illustratively, define an aft hanger cavity 74 when first part 22 and second part 24 are assembled and coupled to the gas turbine engine.

Illustratively, forward hangers 34, 44 and aft hangers 35, 45 are configured to couple to other parts of the gas turbine engine to support ceramic matrix composite airfoil component 12 and outer end wall 14 when first part 22 and second part 24 are assembled. However, at least one hanger on both first part 22 and second part 24 may be used to support ceramic matrix composite airfoil component 12 and outer end wall 14 when first part 22 and second part 24 are assembled.

As suggested in FIG. 3, outer end wall 14 may be, optionally, formed to include an airfoil receiving space 33. Radially outer end 19 of airfoil 18 extends into airfoil receiving space 33. First part 22 is formed to include a first cutout 33A that corresponds to a portion of airfoil receiving space 33. Second part 24 is formed to include a second cutout (not shown) that corresponds to a portion of airfoil receiving space 33. First cutout 33A and second cutout form airfoil receiving space 33 when first part 22 and second part 24 are assembled.

Illustratively, ceramic matrix composite airfoil component 12 is formed as a substantially solid component without any cooling air passages. Alternatively, cooling air passages may be formed within ceramic matrix composite airfoil component 12 or within outer end wall 14 or inner end wall 16.

Illustratively, ceramic matrix composite airfoil component 12 may include one or multiple ceramic ply sheets. Illustratively, the ceramic sheets may be wrapped around a ceramic core. The ceramic sheets and/or the ceramic core may be infiltrated with a ceramic matrix composite material. Alternatively, the ceramic matrix composite airfoil component 12 may be three-dimensionally woven or braided to form a one-piece component.

In some embodiments, a ceramic matrix composite (CMC) airfoil component 12 may include a dovetail (or similar feature) protruding radially out from the radially outer end of the airfoil. A similar feature may exist at the inner end of the airfoil 18 as well. It is contemplated that the metallic elements 22, 24 may be fabricated (cast) to form the outer end wall 14. In some embodiments, a pocket 26, 27 may be machined in the mirrored elements that will capture a single airfoil 12. In some embodiments, the two metallic elements 22, 24 may be placed around the attachment portion 20 of the airfoil 12 thus capturing it between them. In some embodiments, the metallic elements 22, 24 may be joined by brazing, bonding, or bolting them together.

In some embodiments, features used to attach the vane to the static structure may be included in the metallic elements—both inner and outer. In some embodiments, any sealing features can be machined into the metallic elements. In some embodiments, it could be envisioned that the airfoil shape would protrude up into the metallic element to further reduce any leakage or over tip concerns. In some embodiments, the inner end wall 16 could be formed in multiple ways including, but not limited to, duplicating the aforementioned method related to outer end wall 16, using a floating inner ring, or pinning the end wall to a inner hub of the airfoil.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine engine assembly, the assembly comprising a turbine case, and
a turbine vane adapted for use in a gas turbine engine, the turbine vane comprising
a ceramic matrix composite component formed to include an airfoil shaped to interact with hot gasses moving along a primary gas path defined by the gas turbine and an attachment feature that extends from a radial end of the airfoil,
an inner end wall coupled to the ceramic matrix composite component and shaped to define an inner boundary of the primary gas path near an inner radial end of the airfoil, and
a metallic outer end wall coupled to the ceramic matrix composite component and shaped to define a boundary of the primary gas path near an outer radial end of the airfoil, the metallic outer end wall including a first part and a second part coupled to the first part,
wherein the first part and the second part are each shaped to include a gas path panel that defines part of the boundary of the primary gas path and an attachment receiver that forms a pocket into which a portion of the attachment feature included in the ceramic matrix composite component extends,
wherein the first part and the second part of the metallic outer end wall each include at least one case hanger that extends in a radial direction from the gas path panel away from the primary gas path and that is configured to be coupled to the turbine case, and
wherein the pockets formed by the attachment receivers of the first and the second part of the metallic end wall cooperate to define an attachment-feature receiving space shaped to block removal of the attachment feature from the pockets while the first part and the second part of the metallic outer end wall are coupled to one another so that the ceramic matrix composite component is mounted to the metallic outer end wall.

2. The turbine engine assembly of claim 1, wherein the attachment feature has a dovetail shape and the attachment feature receiving space forms a corresponding dovetail-shaped void.

3. The turbine engine assembly of claim 2, wherein the first part of the metallic outer end wall is coupled to the second part of the metallic outer end wall by a diffusion weld.

4. The turbine engine assembly of claim 2, wherein the first part of the metallic outer end wall is coupled to the second part of the metallic outer end wall by a braze layer.

5. The turbine engine assembly of claim 2, wherein the first part of the metallic outer end wall is coupled to the second part of the metallic outer end wall by mechanical fasteners.

6. The turbine engine assembly of claim 1, wherein the attachment receivers included in the metallic outer end wall extend in a radial direction from the gas path panel away from the primary gas path and are located outside the primary gas path.

7. The turbine engine assembly of claim 6, wherein the pocket of each of the attachment receivers receives about half of the attachment feature included in the ceramic matrix composite component.

8. The turbine engine assembly of claim 1, wherein the ceramic matrix composite component is a substantially solid component without cooling air passages formed therein.

9. The turbine engine assembly of claim 1, wherein the attachment-feature receiving space is sized so that the metallic outer end wall is interference fit with the attachment feature of the ceramic matrix composite component.

10. The turbine engine assembly of claim 1, wherein the gas path panels of the metallic outer end wall are formed to include attachment apertures shaped to allow the attachment feature of the ceramic matrix composite component to extend into the attachment-feature receiving space.

11. The turbine engine assembly of claim 1, wherein metallic outer end wall is formed to include an airfoil receiving space into which the radial end of the airfoil extends.

12. The turbine engine assembly of claim 11, wherein the airfoil receiving space has a shape complementary to that of the radial end of the airfoil.

13. The turbine engine assembly of claim 11, wherein the gas path panels of the metallic outer end wall are each formed to include a cutout that forms part of the airfoil receiving space.

14. A turbine engine assembly, the assembly comprising
a turbine case, and
a static vane adapted for use in a turbine, the vane comprising
a ceramic matrix composite component formed to include an airfoil shaped to interact with gasses moving along a primary gas path and an attachment feature that extends from a radial end of the airfoil,
an inner end wall, and
an outer end wall including a first part and a second part that are each shaped to include a gas path panel and an attachment receiver that forms a pocket into which a portion of the attachment feature included in the ceramic matrix composite component extends,
wherein the first part and the second part of the outer end wall each include at least one case hanger that extends in a radial direction from the gas path panel away from the primary gas path and that is configured to be coupled to the turbine case, and
wherein the pockets formed by the attachment receivers of the first and the second part of the outer end wall cooperate to define an attachment-feature receiving space shaped to block removal of the attachment feature from the pockets while the first part and the second part of the outer end wall are coupled to one another.

15. The turbine engine assembly of claim 14, wherein the first part of the outer end wall is coupled to the second part of the end wall by a braze layer.

16. The turbine engine assembly of claim 14, wherein the first part of the outer end wall is coupled to the second part of the outer end wall by diffusion bonding.

17. The turbine engine assembly of claim 16, wherein the attachment feature has a dovetail shape and the attachment feature receiving space forms a corresponding dovetail-shaped void.

18. The turbine engine assembly of claim 17, wherein the attachment-feature receiving space is sized so that the outer end wall is interference fit with the attachment feature of the ceramic matrix composite component.

19. A method of assembling a turbine vane for a gas turbine engine, the method comprising
fabricating a ceramic matrix composite component shaped to include an airfoil and an attachment feature that extends from an outer radial end of the airfoil by infiltrating ceramic-containing fiber reinforcements with ceramic-containing matrix material,
manufacturing an inner end wall including an airfoil receiving space configured to receive the airfoil of the ceramic matrix composite component to support the ceramic matrix composite component within the gas turbine engine,
manufacturing first and second parts of an metallic outer end wall by casting first and second near-net-shape parts and machining the first and second near net shape parts so that the first and second parts each include a gas path panel and an attachment receiver that forms a pocket,
assembling the inner end wall with the ceramic matrix composite components by inserting the airfoil of the ceramic matrix composite components within the airfoil receiving space, and
assembling the first and the second parts of the metallic outer end wall with the ceramic matrix composite component by inserting a portion of the attachment feature into each of the pockets formed in the first and second parts and coupling the first part of the metallic outer end wall to the second part of the metallic end wall in such a way that the attachment feature of the ceramic matrix composite component is trapped in an attachment-feature receiving space formed by the pockets blocking removal of the attachment feature from the attachment-receiving space while the first and the second parts are coupled to one another so that the ceramic matrix composite component is mounted to the metallic outer end wall.

* * * * *